United States Patent [19]

Sakurai et al.

[11] Patent Number: 5,027,268

[45] Date of Patent: Jun. 25, 1991

[54] SYSTEM FOR ADMINISTERING LIFE OF PLANT

[75] Inventors: Shigeo Sakurai, Hitachi; Hiroshi Miyata, Mito; Toshimi Tan, Katsuta; Ryoichi Kaneko, Hitachi, all of Japan

[73] Assignee: Hitachi, Ltd., Tokyo, Japan

[21] Appl. No.: 420,520

[22] Filed: Oct. 12, 1989

[30] Foreign Application Priority Data

Oct. 19, 1988 [JP] Japan .................... 63-261519

[51] Int. Cl.⁵ .............................. G06F 15/20
[52] U.S. Cl. ................... 364/184; 364/551.01
[58] Field of Search ..................... 364/184–187, 364/506–508, 550, 551.01, 551.02, 474.17; 340/679; 73/799, 760, 763

[56] References Cited

U.S. PATENT DOCUMENTS

| | | | |
|---|---|---|---|
| 4,525,763 | 6/1985 | Hardy et al. | 361/24 |
| 4,616,322 | 10/1986 | Niwa et al. | 364/184 X |
| 4,628,458 | 12/1986 | Ohta et al. | 364/184 X |
| 4,875,170 | 10/1989 | Sakurai et al. | 364/507 |
| 4,908,775 | 3/1990 | Palusamy et al. | 364/551.01 X |
| 4,947,341 | 8/1990 | Shine | 364/508 |

*Primary Examiner*—Joseph Ruggiero
*Attorney, Agent, or Firm*—Antonelli, Terry, Stout & Kraus

[57] ABSTRACT

A system clarifies the damaged state of a plant, and estimates the life expectancy of the plant so as to administer the integrity of the plant. The system includes an apparatus for estimating the life expectancy of each of various pieces of component constituting the plant, a data base controlling apparatus, an apparatus for estimating the life expectancy of the entire plant, and a plant life extension and evaluation apparatus. The system is capable of making a specific proposal of a life extension plan which is necessary to and effective for the extension of the entire plant, and which is proposed including economical evaluation, thereby facilitating the conservation of the integrity of the plant, and also facilitating the maintenance and control thereof.

10 Claims, 6 Drawing Sheets

| ITEM | EXISTING ROTOR | NEW ROTOR |
|---|---|---|
| PLANT EFFICIENCY INCREASE | x % | $(x+\Delta x)$ % |
| PERIODICAL INSPECTION | 1 TIME / 2 YEARS | 1 TIME / 4 YEARS |
| MAINTENANCE COST | y / YEAR | $y - \Delta y$ / YEAR |
| LIFE EXPECTANCY | z YEARS | $z + \Delta z$ YEARS |
| STARTING & STOPPAGE | $z_0$ TIMES | $z_0 + \Delta z$ TIMES |

SYSTEM FOR ADMINISTERING LIFE OF PLANT

BACKGROUND OF THE INVENTION

The present invention relates to a system for administering the life of plants, i.e., the life of the plants yet to be consumed, and, more particularly, to a system for administering the life of a plant consisting of a multiplicity of pieces of component, such as a power generating plant.

A typical arrangement of systems of the above-described type which have hitherto been generally used is known from, e.g., Japanese Patent Laid-Open No. 62-276470. In this known arrangement, while the life and the state of deterioration of various pieces of component and parts constituting a plant change due to the passage of time and various stresses applied to these constituents, an estimate of the life of the plant is obtained on the basis of the latest information on the life and the state of deterioration of the constituents of the plant so as to administer the life of the plant.

The above-described prior art is certainly capable of obtaining an estimate as to the life expectancy of the plant concerned. However, the prior art fails to give consideration to the conservation of the integrity of the plant and to the plant life extension. Therefore, with the prior art, it is impossible to positively improve the integrity of the constituent component over its existing state, this being very disadvantageous from the viewpoint of both plant safety and economy.

SUMMARY OF THE INVENTION

It is an object of the present invention to provide a system for administering the life of a plant that is capable of ensuring the plant to be administered in such a manner as to positively improve its integrity, and that is advantageous from the viewpoint of both plant safety and economy.

According to the present invention, there is provided a system for administering the life of a plant comprising: a data controlling apparatus for storing and controlling at least the data on the design conditions of the plant, the operation history of the plant, the characteristics of the materials forming members of the plant, and the history of repair and troubles of the plant; a component-corresponding life expectancy estimating apparatus for estimating the life expectancy of various pieces of component constituting the plant on the basis of the damaged state of each piece of the component, and on the basis of data on the history of each piece of the component which is stored in the data controlling apparatus; a plant life expectancy estimating apparatus for making an overall judgement of the result of the estimation of the component-corresponding life expectancy estimating apparatus, and for estimating the life expectancy of the entire plant; a plant life extension and evaluation apparatus for determining, on the basis of the result of the estimation of the plant life expectancy estimating apparatus, the optimum plan for the extension of the life of each of certain pieces of component selected on the basis of the degree of importance, and for evaluating the grading-up of the component, including the economical value thereof; and an output apparatus for outputting and displaying information on the result of the determination of the plant life extension and evaluation apparatus.

With the plant life administering system in accordance with the present invention, the component-corresponding life expectancy estimating apparatus estimates the life expectancy of each of various pieces of component constituting the plant. On the basis of the result of this estimation, the plant life expectancy estimating apparatus assesses the integrity of the entire plant. In order to improve the integrity of the plant, the life extension and evaluation apparatus makes determinations as to the optimum method of repairing or renewing certain pieces of component ranked in accordance with their degrees of importance from the viewpoint of the function of the plant, and also as to the correct timing of the execution of the method, while evaluating the economical value of the adoption of the method, including such factors as operation costs and maintenance characteristics. In this way, the system ensures that improvement in the reliability and safety of the plant as well as the maintenance thereof to be rationally effected, thereby improving the integrity of the plant.

DETAILED DESCRIPTION OF THE PREFERRED EMBODIMENTS

Figure 2:
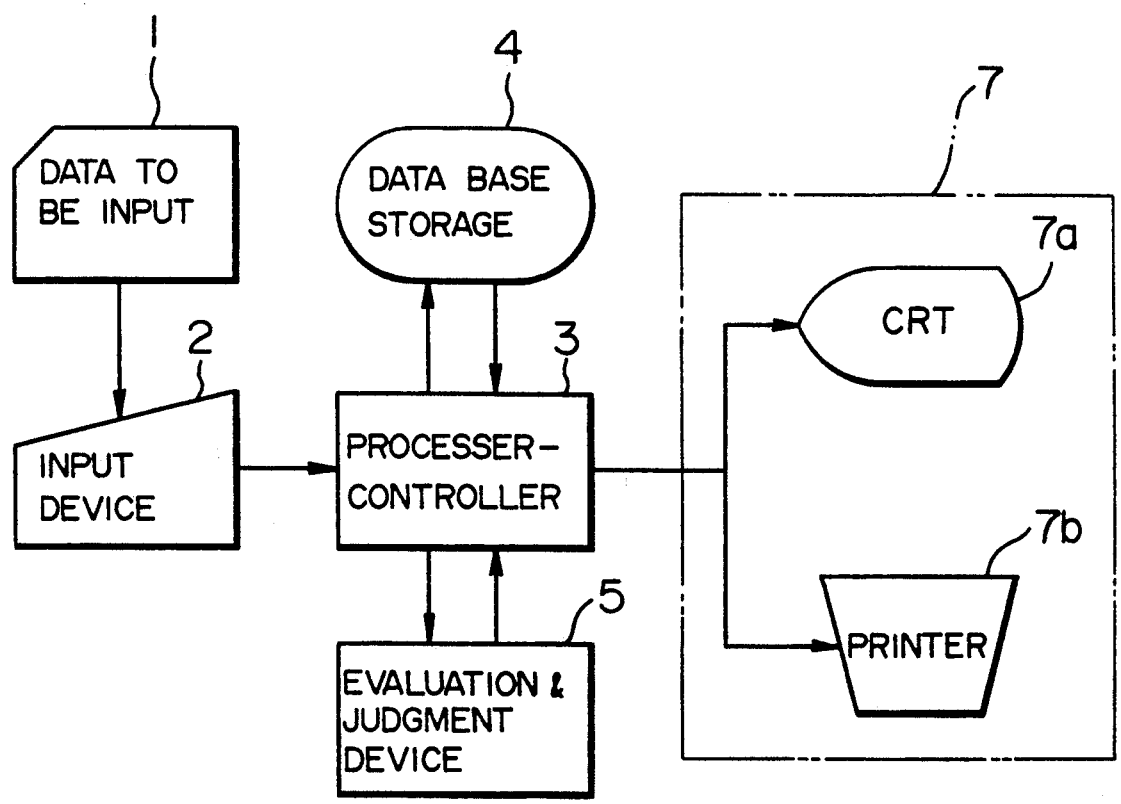
FIG. 2 is a block diagram showing the arrangement of the system.

The present invention will now be described in detail with respect to the illustrated embodiments thereof. FIG. 2 is a block diagram showing a system in accordance with one embodiment of the present invention. In the system, data 1 including data on the plant operation history damage detection data resulting from non-destructive tests, damage detection data resulting from destructive tests (these tests will be described later), and data on the strength of members whose characteristics may deteriorate with the passage of time are input through an input device 2 to a processor-controller 3. The input data are fed to a data base storage 4 via the processor-controller 3 and are then stored in the storage 4. When required, the contents of the data base storage 4 are again input to the processor-controller 3 by a command given through the input device 2, and they are then subjected to predetermined calculations (described later) in the processor-controller 3. The results of these calculations are evaluated and judged by an evaluation and judgment device 5. The results of this operation are output and displayed by an output device 7, that is, by a CRT display 7a and/or printer display 7b.

Figure 1:
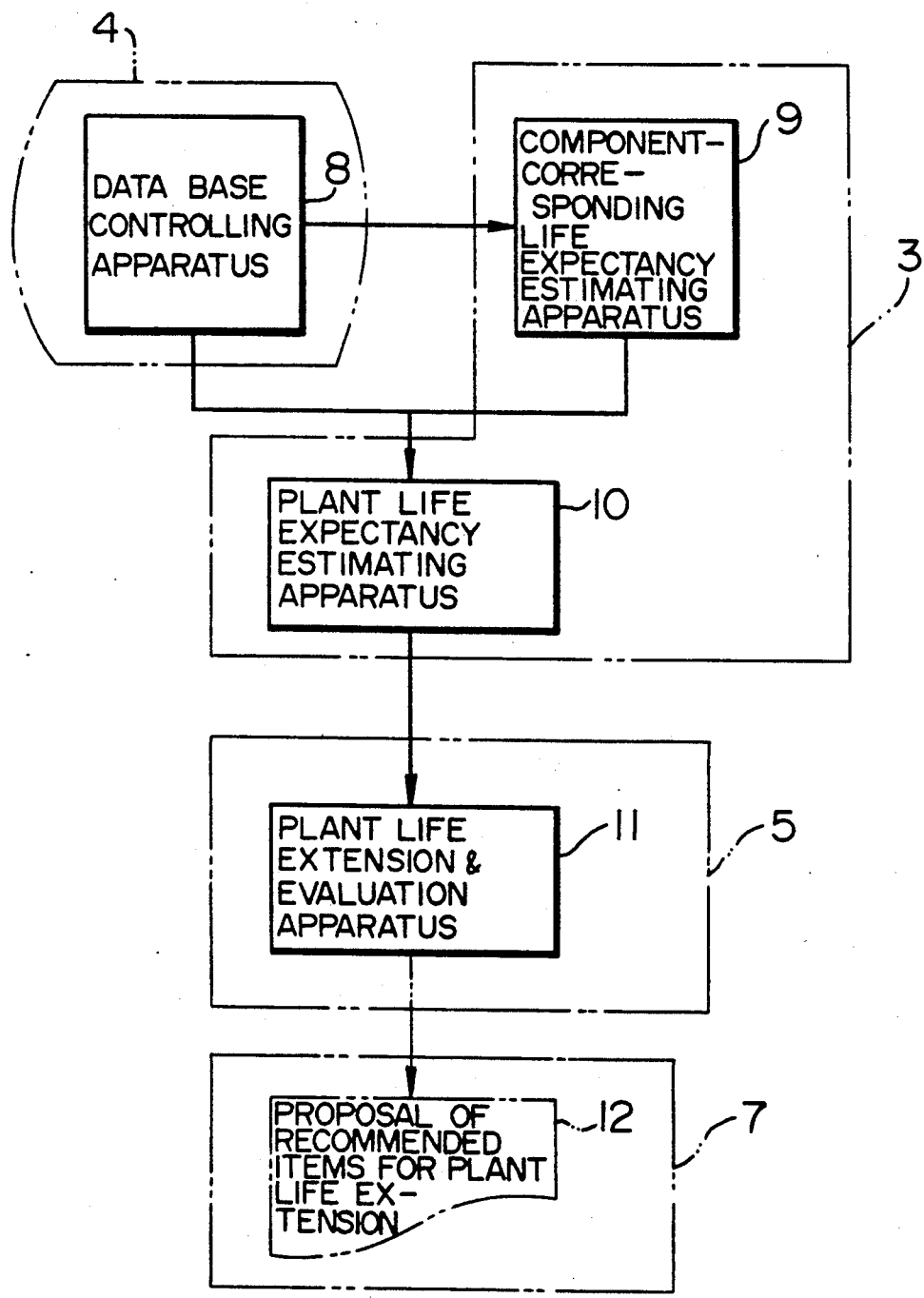
FIG. 1 is a view showing the entire flow of data in a system in accordance with one embodiment of the present invention.

FIG. 1 is a view showing the entire flow of data in the above-described system of the embodiment. As shown in FIG. 1, the system comprises four subsystems. These are a data base controlling apparatus 8 having various data bases and a controller for these data bases, an component-corresponding life expectancy estimating apparatus 9, a plant life expectancy estimating apparatus 10, and a plant life extension and evaluation apparatus 11. Descriptions will now be given of these apparatuses 8 to 11 and the flow of input data through these apparatuses, with reference to FIGS. 3 to 7.

Figure 3:
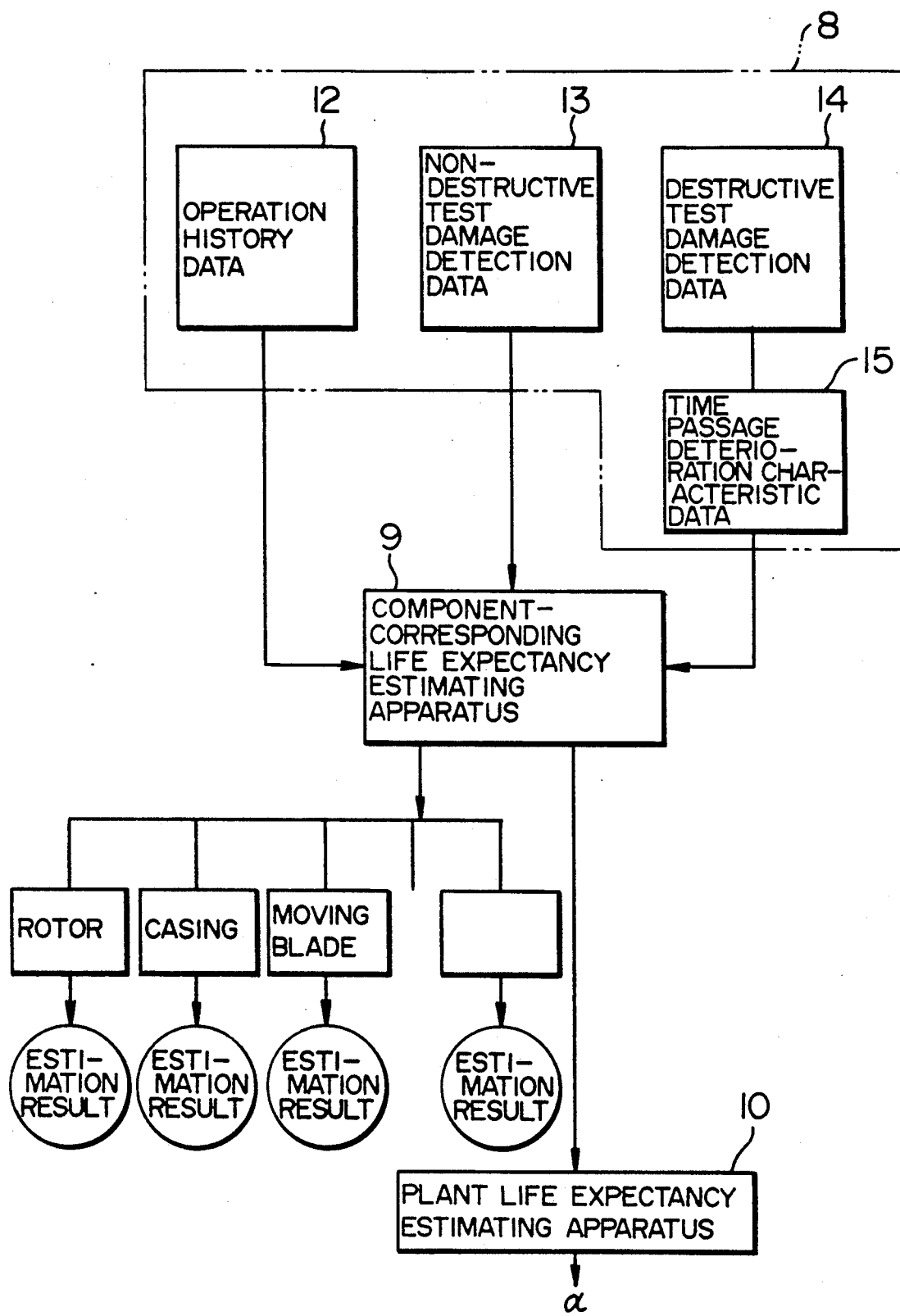
FIG. 3 is a view showing, in detail, a part of the flow shown in FIG. 1.

Referring to FIG. 3, operation history data 12, non-destructive test damage detection data 13, destructive test damage detection data 14, and time passage deterioration characteristic data 15 are stored in and controlled by the data base controlling apparatus 8. The component-corresponding life expectancy estimating apparatus 9 estimates the life expectancy of each of individual members such as a turbine rotor and a casing.

This estimation is performed by using the above-mentioned data so as to diagnose various types of damage and time-passage deterioration of various members. The operation history data 12 is used to calculate the level of fatigue, a type of damage, on the basis of, e.g., the number of times of starting or stoppage experienced, and the number of times of vibration experienced, and also to calculate the level of creep, another type of damage, on the basis of the total time of normal operation under high temperatures. The non-destructive test damage detection data 13 is used to assess the creep damage on the basis of the result of the application of an electric resistance method and the result of the measurement of hardness, and also on the basis of the cavity density obtained by observing the pertinent structure employing a replica method. The data 13 is also used to assess fatigue damage on the basis of the observation of microcracks in the structure. The destructive test damage detection data 14 is data obtained by preparing fine test pieces as samples collected from the actual component, and by subjecting these test pieces to, e.g., creep tests and fracture toughness tests, thereby directly measuring the degree of reduction in the mechanical strength of a member, that is, the degree of deterioration with the passage of time.

Figure 4:
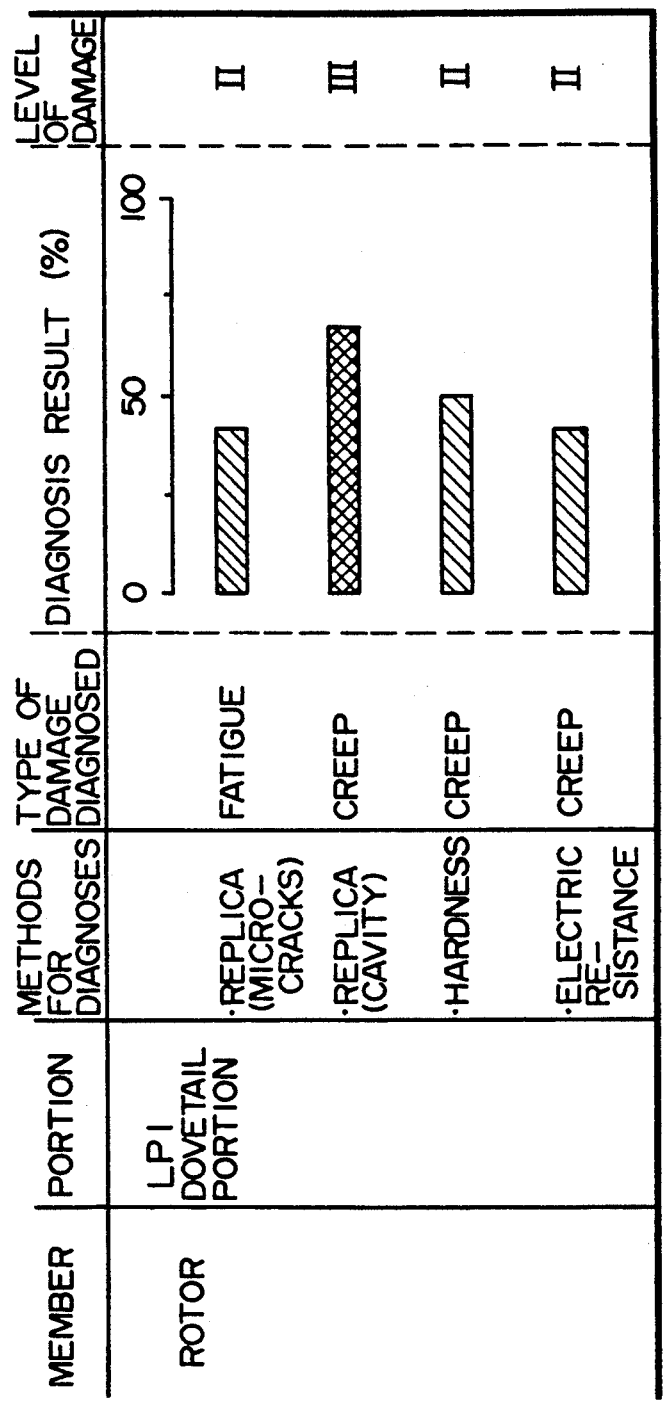
FIG. 4 is a view showing an example of an output of a CRT in response to the operation of the component-corresponding life expectancy estimating apparatus shown in FIG. 1.

The apparatus 9, which uses these data to obtain the above-described diagnoses, outputs the results of the estimation of the life expectancy of each of the various members, such as that shown in FIG. 4. The results of the estimation with respect to each member are expressed as, e.g., a bar graph showing the proportion (in percentage) of the consumed part of service life. The level of each type of damage is classified as one of a plurality of stages, e.g., five stages, while consideration is given to the degrees of reliability of the diagnoses that are based on the data resulting from the various methods for diagnoses. If all the damage levels resulting from all the diagnoses are relatively high, e.g., at the IIIrd level or higher, the results are displayed in a color different from other parts of the CRT display, so as to attract the operator's attention. Among the results of the diagnoses with respect to various portions of each member, that result corresponding to the highest of the damage levels, which indicate the result of the weighting of the methods for the diagnoses, is adopted as the representative result for the member. For instance, in the case of a dovetail portion of an Lp1 (an intermediate-pressure first-stage) rotor, such as that shown in FIG. 4, suffers from creep damage at the IIIrd level and fatigue damage at the IInd level. On the basis of such damage levels, the results of the estimation of the life expectancy of various portions are used as data on the basis of which the levels of damage are compared between various members, and then between various pieces of components. On the basis of the results of diagnoses with respect to various portions of each piece of component, the component-corresponding life expectancy estimating apparatus 9 shown in FIG. 3 adopts, as the representative, the diagnosis result of the portion of each piece of component that suffers from the most serious damage and deterioration.

When the component-corresponding life expectancy estimating apparatus 9 has estimated the life expectancy of various pieces of component constituting the plant, the results of this estimation are input to the plant life expectancy estimating apparatus 10, as shown in FIG. 3. The apparatus 10 evaluates the integrity and reliability of the function that should be fulfilled by the plant concerned. For instance, when the plant concerned is a power generating plant, and when its operation schedule is determined in compliance with the pattern of demands for power, the integrity and reliability of the function to be fulfilled by the power plant to meet the schedule is evaluated. Specifically, on the basis of the future operation schedule, a determination is made as to whether the operation mode of the plant should be a load-following type or a base load type, and the life expectancy of the entire plant which will operate in accordance with the future operation schedule is estimated. For instance, in the case where, although the results of diagnoses with respect to each of various pieces of component show low levels of damage, the future operation schedule requires the plant to be frequently started and stopped, the estimation of the life expectancy is effected while special attention is paid to the state of fatigue and damage of each component, so that the life expectancy of a particular piece of component suffering from the most serious fatigue and damage determines the life expectancy of the entire plant. Thus, data on the future operation schedule is input to the plant life expectancy estimating apparatus 10, so that the apparatus 10 judges the levels of damage of each of various pieces of component while evaluating the reliability of and the damage possibility of the entire plant, so as to estimate the life expectancy of the entire plant.

Figure 5:
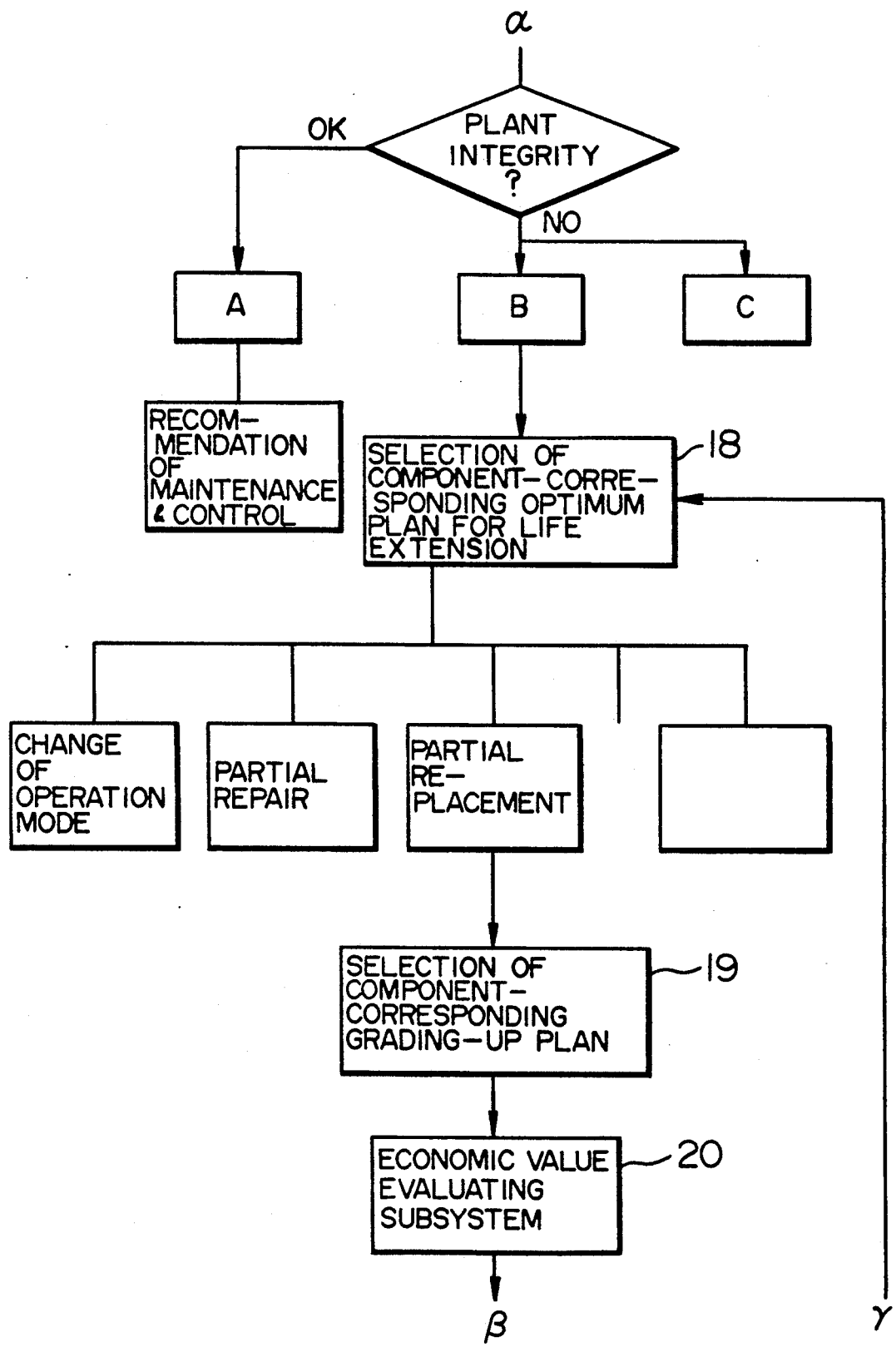
FIGS. 5 and 6 are views showing other parts of the flow in the system.

As the result of this estimation (which is output as indicated by the arrow α in FIGS. 3 and 5), if it is determined that the entire plant maintains its integrity and ensures its safety, a proposal is made concerning, on the basis of the future operation schedule, certain pieces of component and members which should be inspected in the next periodical inspection with priority being given to them (the case indicated by the symbol A in FIG. 5).

On the other and, if it is determined that the service life of the main pieces of component have consumed to such a great extent that it is difficult to reinstate them, it is proposed that these main pieces of component should be abandoned and be totally replaced with new pieces (the case indicated by the symbol C in FIG. 5).

In many cases, it is possible to postpone the end of the service life of the plant by taking proper measures with respect to the most serially damaged portions or pieces of component to improve the integrity of the entire plant (the case indicated by the symbol B in FIG. 5). In this case, the data provided by the plant life expectancy estimating apparatus 10 is input to the plant life extension and evaluation apparatus 11 in which a subsystem 18 selects the optimum plan for the extension of life of each piece of component.

In the apparatus 11, the optimum plan for the extension of the plant life is selected on the basis of the future operation schedule and on the basis of the period of time the plant is required to last, from among, e.g., the change of the operation mode, partial repair, and renewal or replacement of certain members or pieces of component.

An example will be explained, where a proposal is made concerning the renewal of members, presumably the most influential measures for the extension of the plant life.

If the renewal of members of certain pieces of component is selected as the optimum measures for the extension of the plant life from the viewpoint of the future operation, a plan for the grading-up of each of the pieces of component is proposed. This grading-up may be that achieved by the replacement of the existing member with a new member, or by the adoption of techniques which have newly become available to improve the efficiency, to attain excellent maintenance characteristics or to improve reliability These grading-up plans each consist of quantitative data in which performance, efficiency, and reliability are compared between the existing member and a new member and which are displayed in the form of, e.g., a CRT display so as to facilitate the operator's understanding. This operation is performed by a sub-system 19 of the apparatus 11.

For instance, in the case of a rotor, if its blades are renewed, its efficiency will improve by several %, it will exhibit greatly improved reliability while exhibiting excellent maintenance characteristics. The renewal of a member is adopted, however, also on the basis of certain economical analysis in which the operation cost that will possibly be incurred by the use of the existing member in the execution of the future operation schedule is compared with the corresponding cost incurred by the use of new member, and which includes the analysis of the renewal cost. This evaluation of the proposed plan is performed by a subsystem 20 of the apparatus 11, and the resultant data are output, e.g., by the CRT, as indicated by the arrow $\beta$.

In practice, in order to extend the life and to improve the integrity of the entire plant, the renewal of several pieces of component including the most seriously damaged component often proves to be more effective than the renewal of that component alone. Therefore, the subject component of the optimum measures is selected as a combination of proper pieces of component, on the basis of the results of the life expectancy estimation with respect to various pieces component and on the basis of the ranks they occupy in accordance with their degrees of importance from the viewpoint of the function of the entire plant. Specifically, various selections of pieces of component to be renewed and combinations thereof are evaluated by repeating certain processes as indicated by the arrow r in FIGS. 5 and 6, in which economical analyses are performed employing, as the main factors, the operation costs incurred, the renewal cost, and the future operation schedule, until a combination evaluated as the optimum is obtained.

Figures 6, 7:
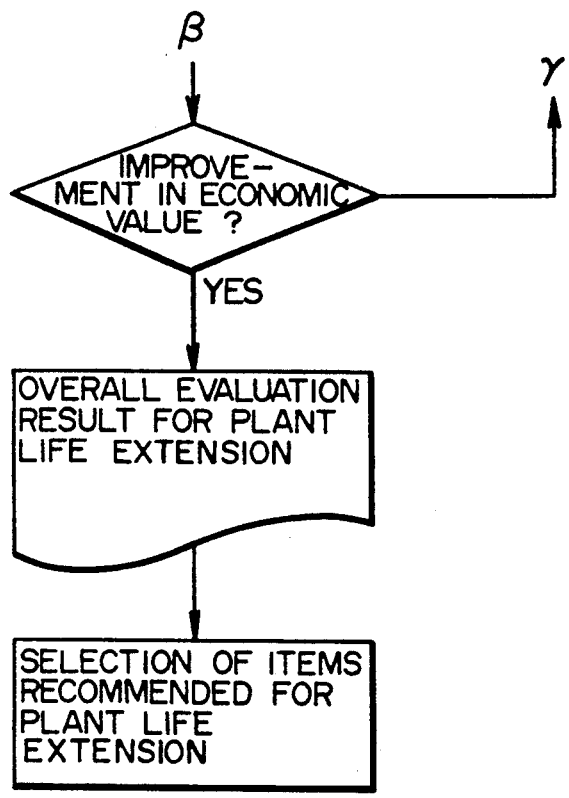
FIG. 7 is a view showing an example of an output of the CRT.

When, as a result of this operation, the optimum combination of members to be renewed is selected, the overall result of the evaluation of the plant life extension plan is output in the form of, e.g., a CRT display and a printer output. The output includes quantitative data not only on the extension of the plant life but also the possible improvement of the maintenance characteristics and the function of the plant in the case where the future operation schedule is executed. For instance, with respect to a single piece of component, the output data shows comparison between the use of the existing member and a new member, as shown in FIG. 7.

Thus, according to the present invention, the life expectancy of each of various pieces of component constituting a plant is estimated, and the level of integrity of the entire plant is assessed. In order to extend the life of the plant, plans for the extension of the plant life are evaluated on the basis of the specific results of the estimation of the life expectancy of each piece of component, then on the basis of this evaluation, the optimum measures for the extension of the plant life are selected. Since the optimum measures are selected while including factors concerning their economic value, it is possible to effect the extension of the plant life while ensuring both improvement in the reliability of the plant and minimization in the maintenance cost.

What is claimed is:

1. A system for administering the life of a plant comprising:
   a data controlling apparatus for storing and controlling at least the data on the design conditions of the plant, the operation history of the plant, the characteristics of the materials forming members of the plant, and the history of repair and troubles of the plant;
   a component-corresponding life expectancy estimating apparatus for estimating the life expectancy of various pieces of component constituting the plant on the basis of the damaged state of each piece of the component, and on the basis of data on the history of each piece of the component which is stored in said data controlling apparatus;
   a plant life expectancy estimating apparatus for making an overall judgement of the result of the estimation of said component-corresponding life expectancy estimating apparatus, and for estimating the life expectancy of the entire plant;
   a plant life extension and evaluation apparatus for determining, on the basis of the result of the estimation of said plant life expectancy estimating apparatus, the optimum plan for the extension of the life of each of certain pieces of component selected on the basis of the degree of importance, and for evaluating the grading-up of the component, including the economical value thereof; and
   an output apparatus for outputting and displaying information on the result of the determination of said plant life extension and evaluation apparatus.

2. A system for administering the life of a plant according to claim 1, wherein said component-corresponding life expectancy estimating apparatus estimates the life expectancy of the various pieces of component while taking into consideration both non-destructive damage detection values obtained with respect to members of each piece of the component and damage detection values resulting from destructive tests of samples collected from the members of the component.

3. A system for administering the life of a plant according to claim 1, wherein said data controlling apparatus stores data recorded therein and concerning at least the design specification of the various pieces of component of the plant, the operation history of the same, the history of periodical inspection of the same, the history of repair of the same, and the history of troubles of the same, and said data controlling apparatus controls data on changes of the various pieces of component with passage of time in such a manner that said data are filed as falling under the above-listed items.

4. A system for administering the life of a plant according to claim 1, wherein said plant life extension and evaluation apparatus determines the optimum life extension plan while taking into consideration, as the necessary conditions, at least a future operation schedule and the service life required of the plant.

5. A system for administering the life of a plant according to claim 1, wherein said plant life extension and evaluation apparatus selects, as the optimum life extension plan, one of the change of the operation mode, partial repair, and the renewal or replacement of members or component of the plant.

6. A system for administering the life of a plant comprising:

a data controlling apparatus for storing and controlling at least the data on the design conditions of the plant, the operation history of the plant, the characteristics of the materials forming members of the plant, and the history of repair and troubles of the plant;

a damage detecting means for detecting the damaged state of members of various pieces of component constituting the plant;

a component-corresponding life expectancy estimating apparatus for estimating the life expectancy of the various pieces of component on the basis of values resulting from the detection of said damage detecting means and on the basis of data on the history of each piece of the component which is stored in said data controlling apparatus;

a plant life expectancy estimating apparatus for making an overall judgement of the result of the estimation of said component-corresponding life expectancy estimating apparatus, and for estimating the life expectancy of the entire plant;

a plant life extension and evaluation apparatus for determining, on the basis of the result of the estimation of said plant life expectancy estimating apparatus, the optimum plan for the extension of the life of each of certain pieces of component selected on the basis of the degree of importance, and for evaluating the grading-up of the component, including the economical value thereof; and an output apparatus for outputting and displaying information on the result of the determination of said plant life extension and evaluation apparatus.

7. A system for administering the life of a plant according to claim 6, wherein said damage detecting means has a non-destructive damage detecting means and a destructive damage detecting means employing fine test pieces prepared as samples collected from the actual component of the plant, said damage detecting means makes three different component-corresponding life expectancy estimations with respect to each piece of the component on the basis of detection data provided by said destructive damage detecting means, detection data provided by said non-destructive damage detecting means, and the operation history data stored in said data controlling apparatus, said damage detecting means being capable of recommending detailed estimation of the life expectancy of component if at least one of the results of the three different estimations of the life expectancy of this component falls outside an allowable range.

8. A system for administering the life of a plant according to claim 6, wherein said plant life expectancy estimating apparatus makes an overall judgement of the result of the estimation of said component-corresponding life expectancy estimating apparatus, while evaluating each of the various pieces of component in accordance with their degrees of importance from the viewpoint of the integrity of the entire plant, said plant life expectancy estimating apparatus being capable of generating an output recommending the adoption of future maintenance and control measures if the level of damage of the component corresponds to an early stage, capable of generating an output proposing the abandonment of the plant if the level of damage of the component corresponds to a stage where proper functions as component are lost, and capable of generating an output to said plant life extension and evaluation apparatus so that the integrity of the plant will be improved and the life of the plant is extended if the level of damage of the component corresponds to a stage before these functions are lost.

9. A system for administering the life of a plant in which the damaged state of each of various pieces of component constituting the plant is detected by detecting damage thereof, the life expectancy of each of the pieces of component is assessed, and, on the basis of this assessment, the life of the component is administered, comprising:

a data base controlling apparatus for storing and controlling at least the data on the design conditions of the plant, the operation history of the plant, the characteristics of the materials forming members of the plant, and the history of repair and troubles of the plant;

a component-corresponding life expectancy estimating apparatus for estimating the life expectancy of each piece of the component by detecting the damaged state of the piece of the component constituting the plant, and by employing the result of this detection and said data base controlling apparatus storing data on the history of each piece of the component;

a plant life expectancy estimating apparatus for estimating, on the basis of the result of the estimation of said component-corresponding life expectancy estimating apparatus, the life expectancy of the entire plant; and a plant life extension and evaluation apparatus for determining, on the basis of the result of the estimation of said plant life expectancy estimating apparatus, the optimum plan for the extension of the life of each of certain pieces of component selected on the basis of the degree of importance, and for evaluating the grading-up of the component, including the economical value thereof.

10. A system for administering the life of a plant according to claim 9, wherein said data base controlling apparatus stores data recorded therein and concerning at least the design specification of the various pieces of component of the plant, the operation history of the same, the history of periodical inspection of the same, the history of repair of the same, and the history of troubles of the same, and said data base controlling apparatus controls data on changes of the various pieces of component with passage of time in such a manner that said data are filed as falling under the above-listed items.

* * * * *